Nov. 29, 1966  F. K. CLARKE  3,288,585
METHOD OF MAKING A MINIATURE LENS
Filed June 22, 1962
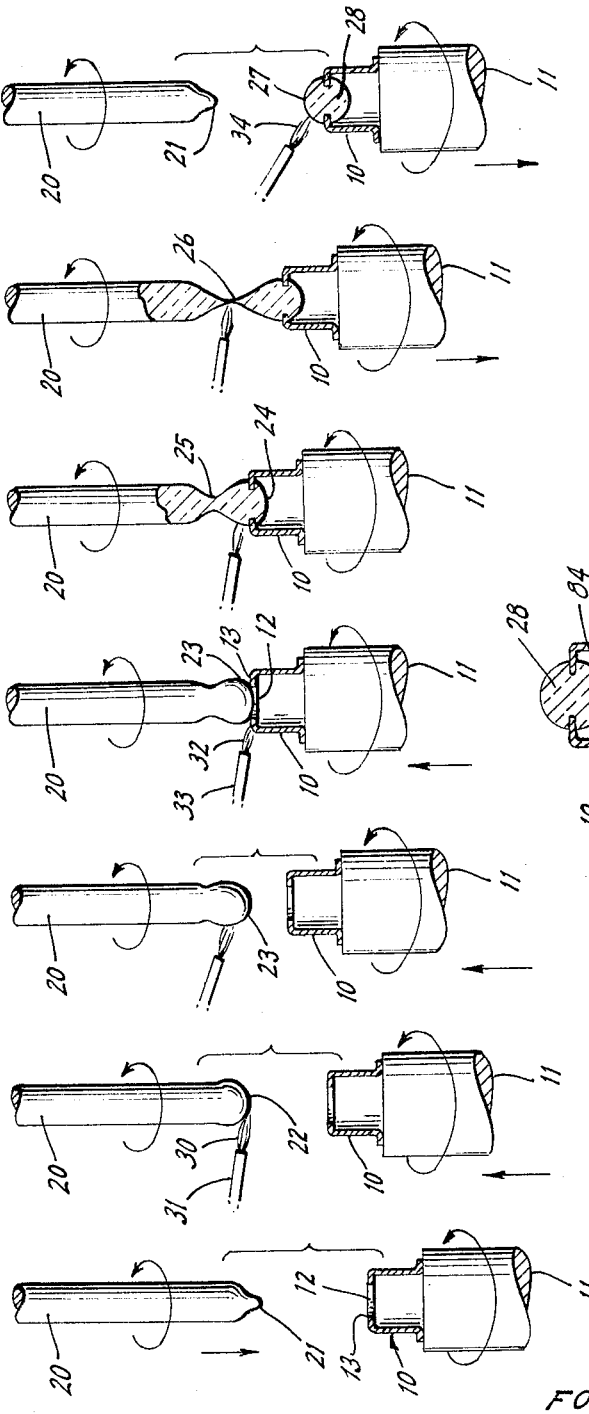
INVENTOR.
FORD K. CLARKE
BY
F. D. Prager
ATTORNEY United States Patent Office 3,288,585
Patented Nov. 29, 1966

3,288,585
METHOD OF MAKING A MINIATURE LENS
Ford K. Clarke, Chalfont, Pa., assignor to Philco Corporation, Philadelphia, Pa., a corporation of Delaware
Filed June 22, 1962, Ser. No. 204,395
2 Claims. (Cl. 65—37)

This invention relates to the manufacture of photoelectric apparatus or cells. It provides a method of mass fabrication of miniature lens units for such apparatus and particularly for photodiodes, phototransistors and the like.

A lens of this type is mounted in a wall of the cell in such a way as to collect substantial amounts of light and to direct the light accurately into a minutely predetermined focal area in the cell. The lens also closes the miniature housing hermetically. Fabrication of such wall and lens combinations has been attempted in the past but has met with difficulty, since the required parts are of such minute dimensions as to make proper independent manipulation of preformed lenses impractical or impossible.

The invention therefore provides a new method of constructing a miniature lens of predetermined form in situ, the procedure being such as to yield sufficient optical accuracy, while it can be used in rapid mass fabrication. This is achieved by a new combination of flame applications with movements of minute glass and housing elements, including rotary and gravitational motion of a viscous glass drop, as will be described presently.

FIGURE 1 is a schematic representation of glass and metal blanks, juxtaposed for performance of the new method. FIGURES 2 to 7 show the same elements in subsequent juxtapositions and arrangements, as established in the performance of the process. FIGURE 8 shows a photoelectric (or electro-optical) transistor, produced with the aid of the new method. All figures are considerably enlarged; the actual diameter of a typical lens formed in accordance with the invention, is only about three or four millimeters, or less.

As shown in FIGURE 1 a generally cylindrical cell or housing element 10 for a photodiode unit is mounted on a holder 11 coaxial therewith; for instance the housing element can be secured to this holder by a clamp, not shown. A chunk, not shown, can be used for the performance of controlled motions of the support. As indicated in the drawing, support 11 and housing 10 are rotated, for example, in the direction of the curved arrow.

Glass rod 20, which has been brought to the proper distance from housing 10 (see vertical arrow), is held in another chuck (not shown) coaxially with housing 10, so as to position the free end 21 of the glass rod opposite an aperture 12 concentrically surrounded by a narrow, inwardly projecting flange 13 at the free upper end of housing member 10. The glass rod is rotated, not only for purposes of flame-forming portions thereof but also for particular purposes of heat control, as will be noted hereinafter. In order to avoid distortion of liquid glass at the time of metal contact (FIGURE 5), holder 11 is rotated in the same direction and at the same angular speed as the glass rod.

It is believed unnecessary at this point to describe other specific details, such as the structure of the devices whereby each article holding chuck can be rotated and axially moved. A variety of machines are available for such purposes, which are known for instance from the art of glassmakers' lathe equipment. It might however be noted that it has been found advantageous for certain typical applications of the invention to make housing 10 of stainless steel (for instance of Type 430 established by the American Iron and Steel Institute) and to make rod 20 for instance of the so-called Corning G12 Glass, whereby the glass in its final form (FIGURE 8) is advantageously exposed to compression.

Referring next to FIGURE 2: the process continues with the step of decreasing the distance between housing 10 and glass rod 20, preferably by raising holder 11, with diode housing 10 thereon, toward the free end of glass rod 20 (see the vertical arrow), while continuing the rotation of both elements. The figure also indicates that a flame 30 is applied to end surface portions of the glass rod, which thereby soften and become liquid, as a result of which they form a newly shaped, approximately hemispherical end portion 22 of the glass rod. For this purpose a relatively broad flame can be applied to the glass rod and the flame can be moved by suitable equipment, not shown. Use may be made of a burner pipe holder similar to the tool rest of a lathe, together with suitable gas valving and flame igniting equipment to allow control over the presence, form, position and applied heat intensity of flame 30 playing over the end of the rotating glass rod.

As shown in FIGURE 3 the upward movement of housing 10 with holder 11, as well as the flame heating of glass rod 20, is continued with an application of heat to somewhat higher end portions of the glass rod. By such flame heating operations a vertically elongated, terminally thinly attached glass drop 23 can be formed on glass rod 20, directly opposite the opening in housing 10 and rotating in unison therewith.

Preheating is advantageously applied to the flange of this housing by a flame 32 emanating from a burner pipe 33, as is shown in FIGURE 4. This preheating serves to make sure that the glass drop is not undesirably chilled when contact is established between the rising and rotating capsule 10 and the rotating liquid glass drop 23 hanging from glass rod 20. This contact is now established, the diameter of the glass drop being slightly greater than that of opening 12.

Until this moment of contact with the housing, glass drop 23 was formed and conditioned mainly by the liquefying effect of the flame heating, the force of gravity which tends to elongate the liquid drop downwardly, and the molecular force within the liquid glass drop itself, this latter force comprising the surface tension of the liquid glass which tends to transform a downwardly elongate drop into a sphere. Now, starting with the moment of metal contact, the liquid glass drop is also subjected to laterally directed forces of adhesion to flange 13 of housing 10. The metal of this housing is of a type which not only provides a suitable seal with the glass, as is known to the art, but which liquid glass will properly and predictably wet during the brief time interval (sometimes about 4 seconds) which is available for the purpose. Glass distortion is avoided by the rotational pattern, as already mentioned.

The metal of flange 13 is advantageously initially conditioned by suitable surface treatment, such as oxidation of the metal surface, or preferably by application of powdered soft glass as a thin coating. Therefore, as indicated in FIGURE 5, when contact between glass drop and housing is established the glass drop is properly drawn onto the flange as well as into the opening of the housing, as a result of which it then forms a body having a slightly sagging, laterally tensioned lower surface 24 within the housing and also, for the moment, having a narrowly necked and slightly axially elongated surface 25 whereby it is still attached to the glass rod above the housing. Flame heating of the glass, particularly in the region destined for contact with the housing, can be continued during this phase, to such extent as this is required by the continual heat loss of the rotating system.

The next following operation is shown in FIGURE 6. Housing 10 on support 11 is now lowered, axially away from glass rod 20, while the rotation of housing, glass rod, and liquid glass drop continues. The downward withdrawal of the housing causes further vertical elongation of the previously formed neck connecting the glass drop to the glass rod, followed by further and extreme thinning out of this neck as indicated at 26, which process is desirably assisted by further application of a gas flame. Some of the liquid glass from the upper part of the drop sinks into housing 10, causing the bottom surface of the drop to sag more than it did on first contact with the housing.

Ultimately, when the housing has been withdrawn from its uppermost position by approximately the diameter of the glass rod or by a somewhat similar distance (the exact details depending on desired lens geometery, the type of glass used, the temperatures etc.), neck 26 is severed. This step can be promoted by a burning-off operation as indicated, which also serves to reestablish a properly formed lower end 21 of the glass rod (FIGURE 7). Thereafter, as already noted, the rotating glass rod is slightly lowered (see vertical arrow in FIGURE 1) to provide for the start of a new cycle for lens forming operations.

As further shown in FIGURE 7, another flame 34 is finally applied to the top surface 27 of the severed glass drop in the aperture of housing 10, to bring this drop to the approximate form of a sphere 28. Desirably this is a concentrated flame, applying heat only to a point or a meridian of this rotating surface, thus aiding the required conversion of the glass drop from upwardly elongated form (FIGURE 6) to rounded form (FIGURE 7) while avoiding undesirably accelerated downward sagging of the drop into housing 10.

By means of these combined expedients the long, liquid glass drop is converted into a congealed glass sphere while it sinks into holder 10. The lower surface of the glass drop, which initially (FIGURE 4) contacts the flange surface of housing 10, changes form to a relatively slight extent, while the upper surface of the drop is radically modified as the liquid glass drop is severed from the glass rod. The drop or lens, with substantially hemispherical lower and upper surfaces, comes to rest and congeals when an approximately equatorial region of the drop has reached contact with the securement to the housing.

It will thus be seen that the new process forms a mounted lens in situ by a cycle of heating and cooling operations, controlling a certain pattern of steps wherein glass is liquefied, kept liquid and congealed in various portions of a glass drop. Particularly during the phases of the process illustrated in FIGURES 5 and 6 the flange-engaging and adjacent portions of the liquid glass drop must have sufficient viscosity to prevent excessively rapid gravitational movement of the drop; the body of the drop must nevertheless retain sufficient liquid mobility during these phases to allow formation of the ultimate spherical form by surface tension. For this reason, a balance is provided between heat input by further flaming and heat output by rotationally enforced cooling of the glass drop and housing, during these phases of FIGURES 5 and 6. This balance is generally kept in favor of a controlled, overall cooling effect, or in favor of at most a very limited net heating effect.

As a result, then, the previously raised temperature of central glass drop portions is available during these phases to promote the forming of a sphere; limited heat input at or near the neck of the glass drop gives further aid to this forming process, by assisting in rapidly converting the elongate top portion of the drop into a hemisphere; and the controlled or dropping temperature, and corresponding viscosity, of lower and middle surface portions of the glass drop insures suitably slow, viscous, gravitational flow of glass through the aperture in the housing, thus holding the glass drop in the required position.

It is thus important that the heat initially supplied to the glass to form a drop (FIGURES 2, 3) be subsequently outwardly dissipated in controlled ways (FIGURES 5, 6), largely by the continued rotation of the drop and housing, this rotation taking place in an ambient maintained at a temperature substantially lower than those of the flames 30, 32, 34, for instance at room temperature. The preferred speed of rotation is such as to avoid appreciable centrifugal distortion of the viscous glass drop. For instance, a speed of about 40 r.p.m. has been used with good success in the fabrication of lenses of 3 to 4 mm. diameter.

Exact temperatures of the various glass drop portions, during the various phases of the process, are unknown at this time and are not readily ascertainable with available equipment, even as to a single type of glass. On the other hand, relative temperature levels and approximate patterns of thermal behavior have been suggested above. As already indicated, such surface heating as is still provided in the later stages of the process is applied to limited surface portions of the glass drop and is limited to the use of minutely concentrated flames, controlled so as only locally to balance or slightly to overcome the cooling effects of the rotary motion, thus causing the surface tension of the rotating and downwardly moving liquid glass to form the approximately spherical body 28. Flame temperatures are of course selected to suit the type of glass which is employed, which in turn is selected for proper optical behavior in actual use. Natural gas flames can be applied with good success for the fabrication of lenses of relatively soft glass. Hotter flames, for instance, oxy-acetylene or oxy-hydrogen flames, are preferred in other cases, so long as they do not adversely affect the composition of the glass by driving off volatile constituents.

The entire operation, comprising the several phases of FIGURES 1 to 7, has been performed in about 25 to 35 seconds, devoting about 4 to 5 seconds to each phase. Repeated similar cycles of such operation can be applied to glass rod 20 until the rod has been used up. With respect to lens 28 it is often preferred to apply a well-known annealing treatment, pursuant to the operation indicated in FIGURE 7.

FIGURE 8 shows an electro-optical transistor 80 assembled with the lens unit 10, 28 produced by the new method. For this purpose lens housing 10 is suitably assembled, as at 81, with the eyelet or ferrule 82 of stem 83 for the transistor, so as to place the transistor's electrode region, generally indicated at 84, in the the focal region of lens 28. Since the lens is rigid with its housing and since the transistor is substantially rigid with the stem assembly thereof it will be seen that an accurately predetermined focal arrangement is thus provided, by virtue of the accurate control over the shape and placement of lens 28 in holder 10 which is achieved by means of the invention.

While only one arrangement of materials for performance of the new process and a few ways of manipulating such materials have been described it should be understood that details of construction and operation are not to be construed as limitative of the invention, except insofar as is recited in the following claims.

I claim:
1. In the fabrication of a small, mounted, spherical lens:
    rotating a glass rod, of small diameter, about the axis thereof, in a cooling atmosphere, at a predetermined angular velocity, to provide cooling of the glass pursuant to heating thereof, and while holding the rotating rod in substantially vertical position;
    simultaneously rotating a ring-shaped lens holder, having similar diameter, at substantially the same angu- lar velocity and in the same direction while holding said holder coaxially with said glass rod and vertically spaced therebelow a distance of the order of magnitude of said small diameter;

applying heat to the lower end of the rotating rod to provide a liquid glass drop dependent from and rotating with said lower end;

effecting slight relative movement between the drop-carrying rotating rod and the rotating holder to lessen said distance and fill a top part of said holder with a bottom part of said drop dependent from the rotating rod and thereby to seal said glass drop into said holder; then slightly increasing the distance between the rotating rod and said holder and locally applying heat to the rod and to the top surface of the glass drop to sever the liquid glass drop therefrom, thereby allowing inner portions of the severed liquid glass drop gravitationally to sink into said holder; and continuing said rotating of the drop with the lens holder to cool at least surface portions of the drop and thus to congeal it, while locally applying further heat to an upper inner part of said surface portions at least during part of the continued rotating, to permit surface tension of the sinking and congealing glass drop to develop approximately spherical form of said drop.

2. A method of fabricating mounted miniature biconvex lenses for photoelectric apparatus and the like, comprising the steps of:

holding a thin, solid glass rod in vertical position, rotating it about the axis thereof, in a cooling atmosphere, at a predetermined angular velocity, and intermittently applying heat to the lower end of the rotating rod, each time providing a minute liquid drop-shaped glass portion or bead dependent from and rotating with said lower end, while holding successive small, open-ended tubular structures coaxially with said rod and in position slightly below said glass rod and rotating each tubular structure held in such position, at substantially the same angular velocity;

sealing peripheral portions of each rotating liquid glass portion to inside portions of the respective rotating structure to effect hermetic closure of said inside portions by the glass; and then supplying further heat, locally applying it to upper portions of the drop-shaped glass portion to detach them from the rod, and thereafter to shape them in upwardly convex form, while continuing the rotation applied by said structure to said drop-shaped glass portion to generally cool the same while it sinks gravitationally into lower inside portions of said structure.

References Cited by the Examiner

UNITED STATES PATENTS

| 2,071,597 | 2/1937 | Vasselli | 65—56 X |
| 2,300,917 | 11/1942 | Gaskill | 65—113 X |
| 2,345,278 | 3/1944 | Monack | 65—55 X |
| 2,517,661 | 8/1950 | Hart | 65—21 X |
| 2,903,826 | 9/1959 | Monack | 65—43 X |

DONALL H. SYLVESTER, *Primary Examiner.*

G. R. MYERS, *Assistant Examiner.*